United States Patent
Abdelhadi et al.

(10) Patent No.: US 9,164,818 B2
(45) Date of Patent: Oct. 20, 2015

(54) EVENT-HANDLER FOR SELECTING RESPONSIVE ACTIONS

(75) Inventors: Sanaa Abdelhadi, Austin, TX (US); Guoyou Chen, Austin, TX (US); Kenneth Bruce MacKenzie, Austin, TX (US); David W. Nip, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 198 days.

(21) Appl. No.: 13/433,558

(22) Filed: Mar. 29, 2012

(65) Prior Publication Data

US 2012/0197951 A1 Aug. 2, 2012

Related U.S. Application Data

(63) Continuation of application No. 12/564,151, filed on Sep. 22, 2009.

(51) Int. Cl.
*G06F 9/54* (2006.01)
*H04L 12/24* (2006.01)

(52) U.S. Cl.
CPC ............... *G06F 9/542* (2013.01); *H04L 12/24* (2013.01)

(58) Field of Classification Search
USPC ........................................................ 709/223
See application file for complete search history.

(56) References Cited

U.S. PATENT DOCUMENTS

| | | | |
|---|---|---|---|
| 5,530,868 A | 6/1996 | Record et al. | |
| 6,094,681 A | 7/2000 | Shaffer et al. | |
| 7,026,929 B1 | 4/2006 | Wallace | |
| 7,219,239 B1 * | 5/2007 | Njemanze et al. | 726/3 |
| 7,293,087 B2 | 11/2007 | Styles et al. | |
| 7,543,024 B2 | 6/2009 | Holstege | |
| 8,332,502 B1 | 12/2012 | Neuhaus et al. | |
| 2004/0024865 A1 * | 2/2004 | Huang et al. | 709/224 |
| 2004/0186739 A1 * | 9/2004 | Bolles et al. | 705/1 |
| 2007/0006034 A1 * | 1/2007 | Bangel et al. | 714/37 |
| 2009/0183023 A1 * | 7/2009 | Rathunde et al. | 714/4 |
| 2010/0268764 A1 * | 10/2010 | Wee et al. | 709/203 |

* cited by examiner

*Primary Examiner* — Angela Nguyen
(74) *Attorney, Agent, or Firm* — Damion Josephs; Robert C. Rolnik

(57) ABSTRACT

A computer implemented method to handle events based on historic actions. An event-handler receives an event, wherein the event has an associated event-type. The event-handler records the event to an event-action history table. The event-handler determines a history associated with the event by reading the event-action history table. The event-handler looks up a row entry in an action table based at least in part on the event-type, wherein the row entry comprises an action. The event-handler executes at least one instruction of the action. The event-handler records the event and action data to the event-action history table.

6 Claims, 4 Drawing Sheets

| | EVENT DESCRIPTION ─210 | COUNT THRESHOLD ─220 | FREQUENCY THRESHOLD ─230 | ACTION LABEL ─240 |
|---|---|---|---|---|
| 201 | EVENT1 | 0 | NA | EMAIL EMPLOYEE1 |
| | EVENT1 | 1 | 2 TIMES AN HOUR | EMAIL EMPLOYEE2 |
| | EVENT2 | 0 | ANY | REDUCE CLOCK FREQUENCY |

| EVENT DESCRIPTION | COUNT THRESHOLD | FREQUENCY THRESHOLD | ACTION LABEL |
|---|---|---|---|
| EVENT1 | 0 | NA | EMAIL EMPLOYEE1 |
| EVENT1 | 1 | 2 TIMES AN HOUR | EMAIL EMPLOYEE2 |
| EVENT2 | 0 | ANY | REDUCE CLOCK FREQUENCY |
| ... | | | |

FIG. 3A

| EVENT DESCRIPTION | COUNT | TIMESTAMP | ACTION LABEL |
|---|---|---|---|
| EVENT1 | 1 | 12:01PM | EMAIL EMPLOYEE1 |
| ... | | | |

FIG. 3B

| EVENT DESCRIPTION | COUNT | TIMESTAMP | ACTION LABEL |
|---|---|---|---|
| EVENT1 | 1 | 12:01PM | EMAIL EMPLOYEE1 |
| EVENT1 | 2 | 12:31PM | EMAIL EMPLOYEE2 |
| ... | | | |

EVENT-HANDLER FOR SELECTING RESPONSIVE ACTIONS

This application is related to commonly assigned and co-pending U.S. patent application Ser. No. 12/564,151 entitled "EVENT-HANDLER FOR SELECTING RESPONSIVE ACTIONS," filed on Sep. 22, 2009 and hereby incorporated by reference.

BACKGROUND

The present invention relates generally to a computer implemented method for selecting responsive actions. More specifically, the present invention relates to referencing earlier attempted actions, if sufficiently current, and responding with at least one alternate action.

Systems management software installed on data processing systems are used to detect and catalog events. An event is a signal that indicates a condition of a resource of a data processing system. An event can be, for example, a condition related to a rotation rate of a fan. Accordingly, the event can be a signal generated to identify both the resource and the condition of the resource. Some events can be asynchronously generated from an error condition. In addition, multiple events may be aggregated together to form an event summary. An event summary is an event that describes at least two other events. For example, an event summary can be a count of the number of times a fan speed exceeded a threshold in the previous hour. A resource is a physical data processing hardware or virtual resource, backed by physical data processing hardware. A resource can correspond to a system, subsystem, software program, or device. A resource can have attributes such as a temperature. An event, on the other hand, may be a request such as a hypertext protocol request at a server, or a report that a processor on that server has met or exceeded a temperature. Accordingly, the use of events can be helpful to collect information about a data processing system's status.

One or more events can be indicative of an underlying problem or anomaly. Accordingly, it is helpful that system administrators pay attention to some events under some conditions.

SUMMARY

The present invention provides a computer implemented method to handle events based on historic actions. An event-handler receives an event, wherein the event has an associated event-type. The event-handler determines if there is a history associated with the event by reading the event-action history table. The event-handler looks up a row entry in an action table based at least in part on the event-type, wherein the row entry comprises an action. The event-handler executes at least one instruction of the action. The event-handler records the event and action data to the event-action history table.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 2 is an action table in accordance with an illustrative embodiment of the invention;

FIG. 3A is an event-action history table at a first time in accordance with an illustrative embodiment of the invention;

FIG. 3B is an event-action history table at a second time in accordance with an illustrative embodiment of the invention;

DETAILED DESCRIPTION OF THE PREFERRED EMBODIMENT

Figure 1:
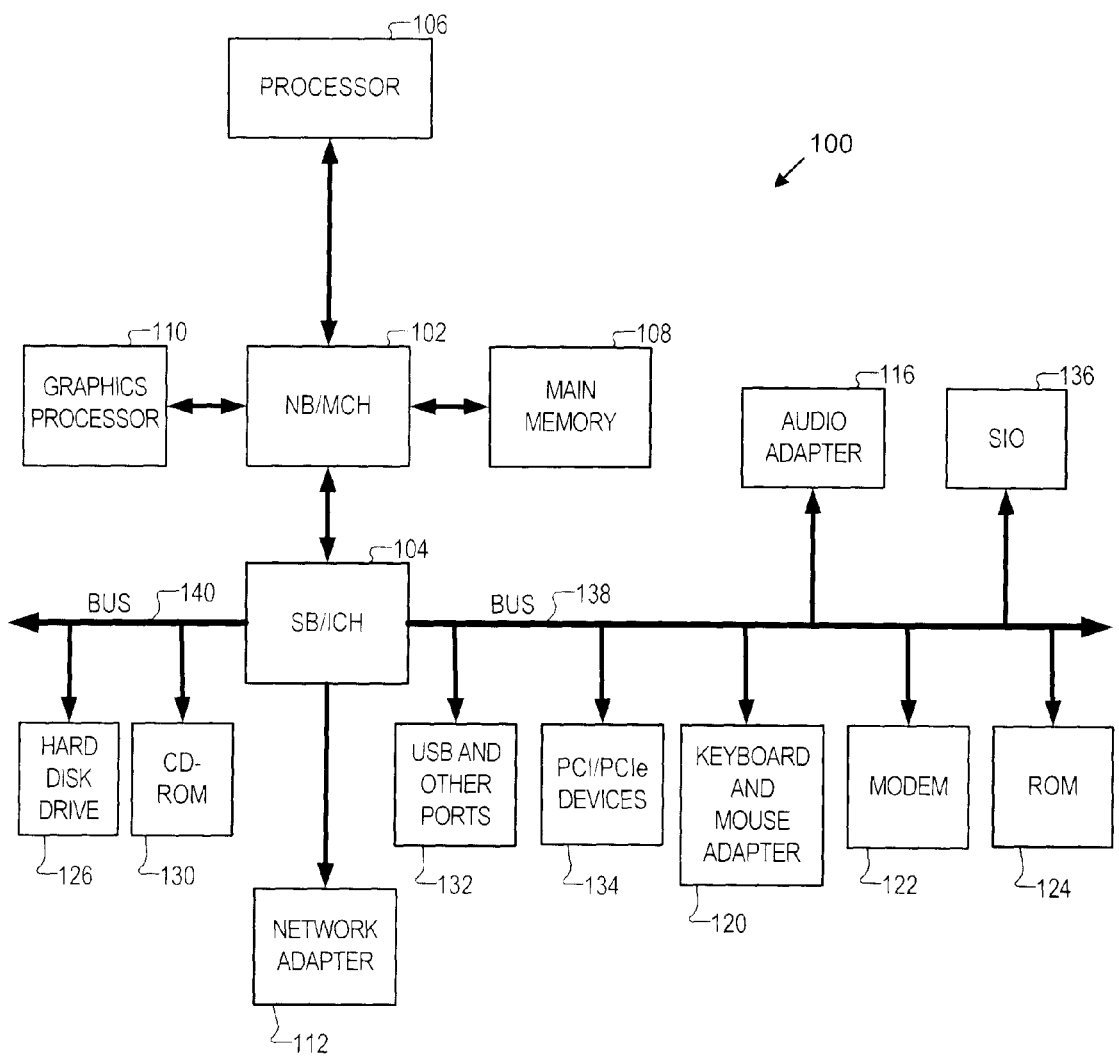
FIG. 1 is a data processing system in accordance with an illustrative embodiment of the invention.

With reference now to the figures and in particular with reference to FIG. 1, a block diagram of a data processing system is shown in which aspects of an illustrative embodiment may be implemented. Data processing system 100 is an example of a computer, in which code or instructions implementing the processes of the present invention may be located. In the depicted example, data processing system 100 employs a hub architecture including a north bridge and memory controller hub (NB/MCH) 102 and a south bridge and input/output (I/O) controller hub (SB/ICH) 104. Processor 106, main memory 108, and graphics processor 110 connect to north bridge and memory controller hub 102. Graphics processor 110 may connect to the NB/MCH through an accelerated graphics port (AGP), for example.

In the depicted example, local area network (LAN) adapter 112 connects to south bridge and I/O controller hub 104 and audio adapter 116, keyboard and mouse adapter 120, modem 122, read only memory (ROM) 124, hard disk drive (HDD) 126, CD-ROM drive 130, universal serial bus (USB) ports and other communications ports 132, and PCI/PCIe devices 134 connect to south bridge and I/O controller hub 104 through bus 138 and bus 140. PCI/PCIe devices may include, for example, Ethernet adapters, add-in cards, and PC cards for notebook computers. PCI uses a card bus controller, while PCIe does not. ROM 124 may be, for example, a flash binary input/output system (BIOS). Hard disk drive 126 and CD-ROM drive 130 may use, for example, an integrated drive electronics (IDE) or serial advanced technology attachment (SATA) interface. A super I/O (SIO) device 136 may be connected to south bridge and I/O controller hub 104.

An operating system runs on processor 106, and coordinates and provides control of various components within data processing system 100 in FIG. 1. The operating system may be a commercially available operating system such as Microsoft® Windows® XP. Microsoft and Windows are trademarks of Microsoft Corporation in the United States, other countries, or both. An object oriented programming system, such as the Java™ programming system, may run in conjunction with the operating system and provides calls to the operating system from Java™ programs or applications executing on data processing system 100. Java™ is a trademark of Sun Microsystems, Inc. in the United States, other countries, or both.

Instructions for the operating system, the object-oriented programming system, and applications or programs are located on storage devices, such as hard disk drive 126, and may be loaded into main memory 108 for execution by processor 106. The processes of the present invention can be performed by processor 106 using computer implemented instructions, which may be located in a memory such as, for example, main memory 108, read only memory 124, or in one or more peripheral devices.

Those of ordinary skill in the art will appreciate that the hardware in FIG. 1 may vary depending on the implementation. Other internal hardware or peripheral devices, such as flash memory, equivalent non-volatile memory, and the like, may be used in addition to or in place of the hardware depicted in FIG. 1. In addition, the processes of the illustrative embodiments may be applied to a multiprocessor data processing system.

In some illustrative examples, data processing system 100 may be a personal digital assistant (PDA), which is configured with flash memory to provide non-volatile memory for storing operating system files and/or user-generated data. A bus system may be comprised of one or more buses, such as a system bus, an I/O bus and a PCI bus. Of course, the bus system may be implemented using any type of communications fabric or architecture that provides for a transfer of data between different components or devices attached to the fabric or architecture. A communication unit may include one or more devices used to transmit and receive data, such as a modem or a network adapter. A memory may be, for example, main memory 108 or a cache such as found in north bridge and memory controller hub 102. A processing unit may include one or more processors or CPUs. The depicted example in FIG. 1 is not meant to imply architectural limitations. For example, data processing system 100 also may be a tablet computer, laptop computer, or telephone device in addition to taking the form of a PDA.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The aspects of the illustrative embodiments provide a computer implemented method, data processing system, and computer program product for recording events and responsive actions. Such a computer implemented method may permit an escalation of event handling through the selection of successive levels of action. An action is a signal transmitted in order to directly or indirectly change the status of a resource. An action can be sending a remote notification message. A remote notification message is a message carried by a signal that targets a device that is likely to be in another room as compared to the room that houses the data processing system executing the event-handler. The remote notification message can be, for example, a text message, an electronic mail, and a voice message. The device can be a personal communication device. A personal communication device is a device typically used only by one person. For example, the personal communication device can be a mobile telephone, a pager, a laptop computer equipped with an email client, and the like.

FIG. 2 is an action table in accordance with an illustrative embodiment of the invention. Row entry 201 in action table 200 identifies fields that hold details concerning when or how an action can be triggered. A criterion for finding a match may be at least one of several fields. A row entry is composed of fields. In this case, the fields are event description 210, count threshold 220, frequency threshold 230, and action label 240. The event description may be a specific resource associated with an event-type. An event-type is a classification used to identify events that share a common feature. For example, an event-type can be a fan revolution speed that crosses a predefined threshold. Such an event may carry a label that expresses to a human being the nature of the event, for example, "fan slow". Another event-type can be a power failure of one or more hardware components. Such an event-type may carry a label of, for example, "power off". Further event-types can be, for example, fan failure, memory utilization above a preset memory level, and processor usage above a preset usage level, among others. A preset memory level is threshold related to an indication of usage of memory. A preset usage level is a threshold related to an indication of processor usage. In addition, an event-type can be a resource failure, where a resource fails to respond. In each case, the label for an event corresponds to a condition of a resource that is physical or relies on a physical device to provide functionality. An event description may be a combination of an event-type and a descriptor that identifies the particular one of the resources associated with the event. For example, the event description can be "fan slow—fan21" in one case, and "power off—backplane alpha" in another.

For each row entry, an event description is associated with an action that can be one of several actions to be taken with respect to the event that meets the event description. A determining factor concerning which of several actions to take can be criteria that compares a count of a particular event to a count threshold. The count threshold is a criterion that is satisfied if the count currently experienced for a resource matches the count threshold. Alternatively, the count threshold may be a range, bounded or unbounded, that is satisfied by the count currently experienced for a resource. For example, row entry 201 describes an Event1 during times when count threshold 221 of 0 prior events are detected, as well as a 'not available' or 'don't care' frequency, and an action label 241 of "Email Employee1'. Accordingly, an event-handler may perform an action of emailing Employee1 in response to receiving an event (corresponding to a resource) at a time when no previously detected Event1 events have occurred in accordance with row entry 201.

A count corresponding to a resource may be the number of times an event has been detected for a resource after an initialization of the resource. The count can also be limited to recurring events for which a particular action has been performed in response to a event. An initialization of a resource can be application of power, successful self-testing of the resource, and/or satisfying a prolonged period of correct operation by the resource, among others. A prolonged period of correct operation can be a period, which is predetermined to imply that a resource has received sufficient attention to place the resource in a satisfactory state.

A row entry can include information consisting of a count threshold, a frequency threshold, and/or a previous action (not shown). Each value in the row represents criteria by which incoming events are judged, except the action label. The action label describes an action targeted to be performed in response to the criteria being met. Accordingly, the action table includes one or more row entries, as described above.

The action label, such as action label 240, may be a name for executable code, which can be resolved by a data processing system to execute the code and dispatch at least one signal of the corresponding action. For example, action label 241 may be "Email Employee1". The action may be a program name, and correspond to command line variables to allow for insertion of event details to be placed in a body of an email or other message. The event-handler may use such a label name to resolve the executable code and to perform the steps of the executable code, optionally with reference to the event description 210 or to count 220.

A row entry can include a frequency threshold for the event described in the same row. A frequency threshold is a rate for two or more events that meet criteria. A frequency threshold can be, for example, two times an hour. A frequency threshold field may be expressed as a range that is bounded or unbounded. A typical range may be greater than twice an hour.

It is appreciated that criteria for taking action described by an action label may include matching or meeting conditions described in event description, count threshold and frequency threshold fields, additional criteria may be tested in order to find a matching row entry to an event. For example, a valid time field may be present which may define allowed times of day for an action to occur. Such a field can direct service calls to employees that are on call on a specific schedule. Accordingly, many additional fields can be applied to more precisely trigger remedial actions.

A further criterion can be a previous action. A previous action is a descriptor in a row entry that is used to compare the previously recorded action for an event. In this alternate embodiment, the event-handler may compare criteria of the row entry to an event, where a match occurs provided a previously recorded action of the event matches the previous action of the row entry. Thus, responsive to a match in the action table, the event-handler may perform the action described in the matched row entry. In other words, the next action to perform, is related to the previous action, in this alternate embodiment action table.

FIG. 3A is an event-action history table at a first time in accordance with an illustrative embodiment of the invention. An event-action history table is a data structure used to record at least pairs of events and actions that were taken in response to the event. Event-action history table 310 can be populated with event-action 301, for example, upon performance of the action associated with row entry 201 of FIG. 2. An event-action is an entry to a row in an event-action table. Accordingly, the event-action can describe the number of times a particular action was performed for a particular event. Event-actions are, for example, event-action 301 and event-action 351, shown in FIG. 3B. Event-action 301 may contain "Event1" 311 with frequency count 321 of 1, at timestamp "12:01 PM" 331 for "Email Employee1" 341. A timestamp is an indication of the time the specified action was invoked. "Email Employee1" 341 may be a previously recorded action. A previously recorded action is an action recorded by the event-handler.

FIG. 3B is an event-action history table at a second time in accordance with an illustrative embodiment of the invention. Event-action history table 350 may include two events, Event1 312 and Event1 352. The count corresponding to each event-action is "1" 322 and "2" 362, respectively. Each event-action includes a timestamp, for example, "12:01 PM" 332 and "12:31 PM" 372, respectively, such as timestamp "12:01 PM" 331 in FIG. 3A. Each event-action may further include action labels, namely, "Email Employee1" 342 and "Email Employee2" 392.

Figure 4:
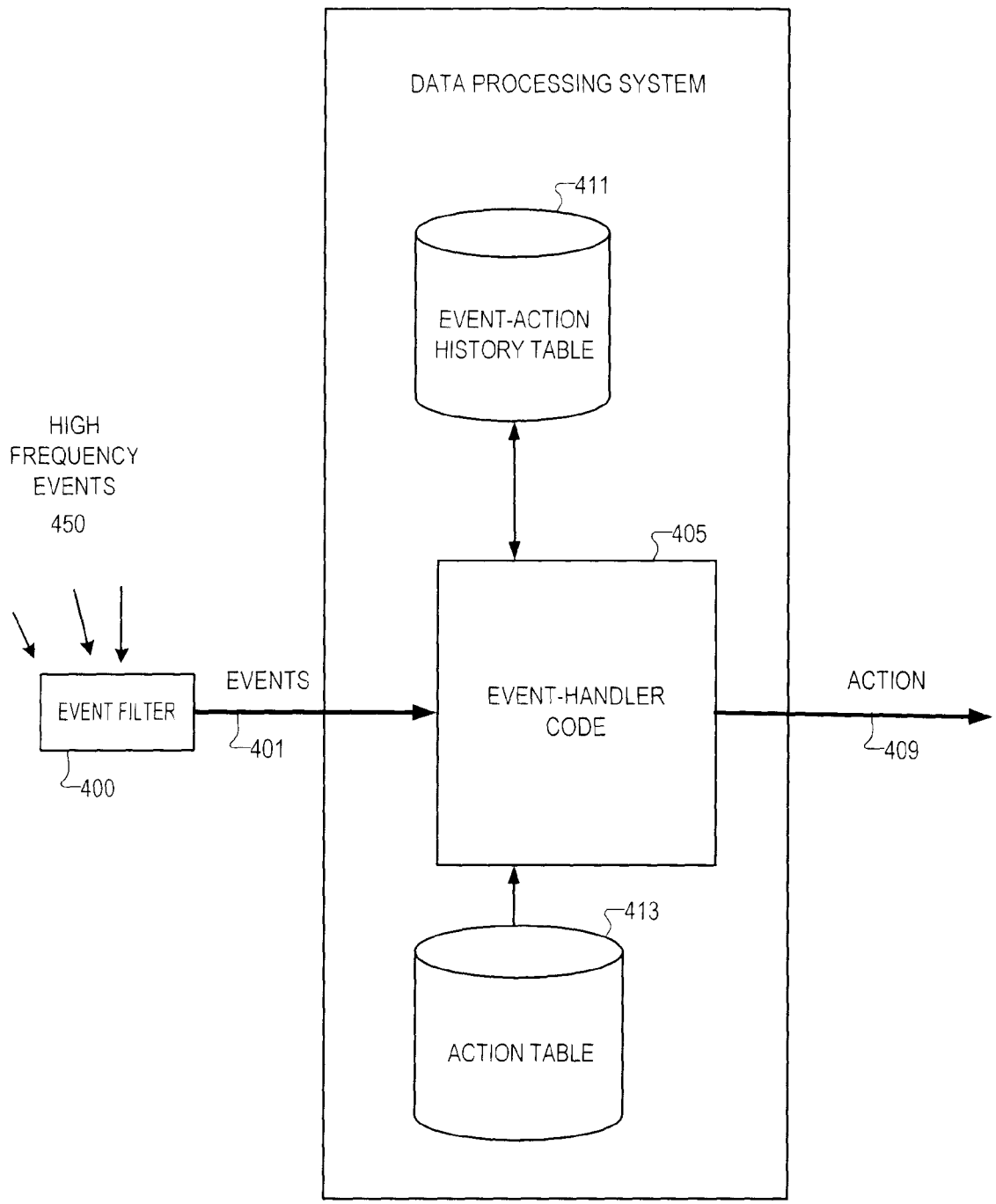
FIG. 4 is an event-handler in a data processing system in accordance with an illustrative embodiment of the invention.

FIG. 4 is an event-handler in a data processing system in accordance with an illustrative embodiment of the invention. Event-handler code 405 can be a software component. A software component is executable code executed by a processor. Accordingly, event-handler code 405 may read from and write to event-action history table 411, in response to receiving one or more events 401. Event-handler code 405 may read or look-up row entries in action table 413. Based on the look-up, event-handler code 405 may transmit an action 409 when executed on computing resources such as data processing system 100, of FIG. 1. The event-handler code may, when coupled to the data processing system, execute at least one instruction of the action. In addition, the event-handler may encapsulate program code instructions together with data structures upon which the code relies. For example, event-handler code 405, event-action history table 411, and action table 413 may be implemented as an object within an object oriented data processing system. Although events are shown arriving from outside the data processing system, it is appreciated that events may occur from within the data processing system. Although actions are shown issuing from the data processing system, it is appreciated that actions may be directed to components or resources within the data processing system.

Events can be summarized by event filter 400. An event filter aggregates events and provides an event as a signal to event-handler code 405. By summarizing events in this manner, the event-handler code may be sent events that are fewer as compared to operation without an event filter. Use of event filter 400 may trigger an action to satisfy a grouping of events that the event filter processes.

Figure 5:
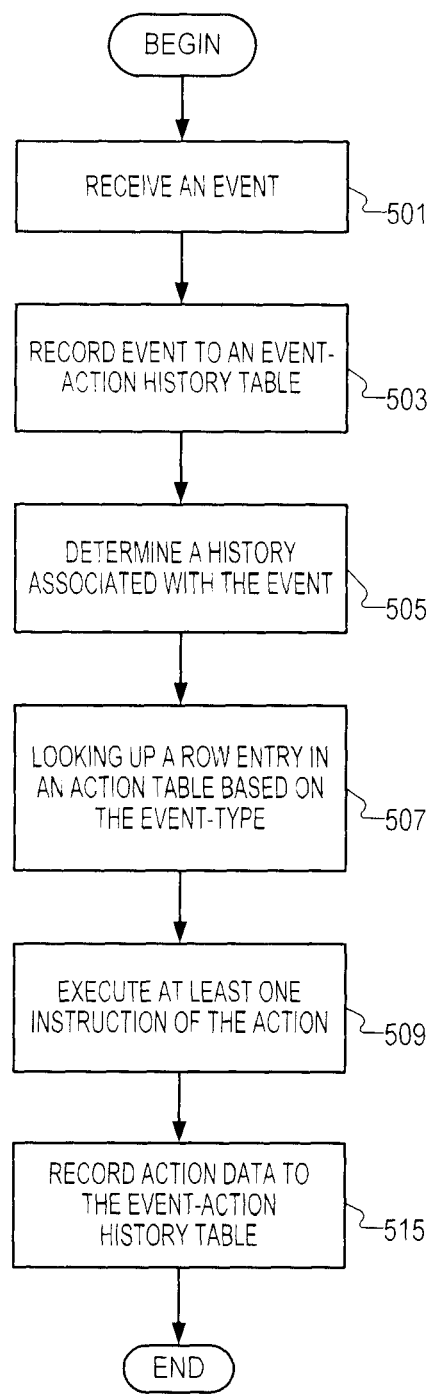
FIG. 5 is a flowchart of steps performed by an event-handler in accordance with an illustrative embodiment of the invention.

FIG. 5 is a flowchart of steps performed by an event-handler in accordance with an illustrative embodiment of the invention. The event-handler may be code executed on a processor, such as processor 106 of data processing system 100 of FIG. 1. Initially, event-handler receives an event (step 501). For example, the event can be "Fan 1—low speed". Alternatively, an event may be a hypertext transport protocol request in a sequence of hypertext transport protocol requests having a frequency above a preset level. Accordingly, such an event may correspond to an incipient contention issue associated with a data processing system operating as a web server. Next, the event-handler may record the event to an event-action history table (step 503). The recording of the event to the event-action history table can include forming an event-action, for example, by adding a field to the event-action history table, including, for example, "Event1" 311 of FIG. 3A.

Next, the event-handler may determine a history associated with the event (step 505). This step may be performed by reading or looking-up row entries of the event-action history table. The step can include reading a previous action corresponding to the event. In addition, the event-handler can determine a count for the event, where the count is the historical number of times the event has occurred for the resource, for example, since a point in time. Alternatively, the history can include a previously recorded action, for example previously recorded action "Email Employee1" 341 of FIG. 3A. The previously recorded action may be compared to a previous action in an action table, for example action table 200 of FIG. 2. Based in part on the previous action, a corresponding action description may be used by the event-handler to select the new action to take.

Next, the event-handler may look up a row entry in an action table based on the event-type (step 507). This step may also include comparing the count, determined at step 505, to a count threshold, for example, count threshold 221 of FIG. 2. This comparison can be considered a match when the count equals the count threshold of a row entry. It is appreciated that additional matching criteria can exist for step 507. For example, the matching criteria can be equal to or greater than. In addition, the event-handler may calculate a frequency based on a timestamp of a previously logged event in relation to a most recently received event. As such, the frequency established in relation to the most recently received event may be used to compare in the action table (frequency field 230) to determine if the row entry compares or satisfies the criteria established therein in relation to the existing frequency.

Next, the event-handler may execute at least one instruction of the action looked up in the previous step (step 509). If the event received is the first event received related to a particular resource, the action can include a preliminary remedy to the event. A preliminary remedy is an initial remedy which, from experience or based on resource availability, is effective in resolving an event in many cases. If the event received is a second or later event received related to a resource, the action can include an advanced remedy to the event. An advanced remedy to an event is a remedy that is effective in some cases where an initial remedy is not effective in resolving the event.

In response to executing the at least one instruction, the event-handler may record action data to the event-action history table (step 515). Action data is data that identifies the action taken. Action data may be, for example, event-actions entered as rows to the event-action table, for example event-action table 350 of FIG. 3B. The action taken may be identified with an action label, for example, action label 240 of FIG. 2. Processing may terminate thereafter.

It is appreciated that the step of recording the action data and the event (steps 515 and 503, respectively) may be performed in a single write operation to the event-action history table. Accordingly either step 503 may perform the additional step of recording action data, or step 505 may perform the additional step of recording the event, while the alternately numbered step may be optional.

The illustrative embodiments permit a system administrator to set up escalating actions for a data processing system to perform or otherwise transmit to account for recurring events. Accordingly, a subsequent action may be varied from a previous action. For example, an error condition can be responded to in a manner different from the first action taken. In other words, a comparison of the previously recorded action to an action table's previous action can be the basis for selecting a new action for the newest iteration of a particular event. Described above, is a way to email a different employee, for example, as one way to follow-up with different actions. The actions are different with respect to at least with respect to multiple occurrences of the same event.

Where an event is a hypertext transport protocol request in a sequence of hypertext transport protocol requests having a frequency above a preset level a corresponding action may be to request that a hypervisor configure and/or provision a second web server to share the processing load that impacts an initial web server.

In addition, the illustrative embodiments may sequence actions so that a previous action is sending a real-time message to a personal communication device and the manner different than the previous action is sending a real-time message to a second personal communication device. A real-time message is a message that is dispatched in a manner expected to be noticed within minutes of the message dispatch, for example, a page notification on a mobile paging device.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for handling events based on historic actions, the computer implemented method comprising:
receiving an event, wherein the event has an associated event-type, wherein the event is a hypertext transport protocol request in a sequence of hypertext transport protocol requests having a frequency above a frequency threshold;

determining a history associated with the event by reading an event-action history table and by locating a previously recorded action comprising instructions to send a real-time message to a first personal communication device, the previously recorded action corresponding to the event, whereby determining arrives at a count for the event wherein the event-action history table has at least one row, wherein the at least one row comprises a first timestamp;

looking up a row entry in an action table based at least in part on the event-type, wherein the row entry comprises an action, and looking up the row entry further comprises iteratively comparing the count to a count threshold of at least one row entry;

comparing a frequency of the event-action to a frequency threshold of at least one row entry, and wherein the looking up forms a match to at least one selected from the group consisting of a row entry's count threshold, and the row entry's frequency threshold; and looking up the row entry in the action table based on the previously recorded action;

executing at least one instruction of the action by sending a real-time message to a second personal communication device, as described in the action, different than the first personal communication device, wherein the previously recorded action is a preliminary remedy and the manner different than the previously recorded action is an advanced remedy; and recording the event and action data to the event-action history table to form a second row as an event-action, wherein the second row comprises a second timestamp.

2. The computer implemented method of claim 1, wherein recording the event and action data comprises recording a timestamp with the action data.

3. The computer implemented method of claim 1, wherein the event-action history table comprises a previously recorded action with respect to the event, and looking up forms a match, provided the previously recorded action matches the previous action.

4. The computer implemented method of claim 1, wherein the resource is a server, and the action is provisioning a server.

5. The computer implemented method of claim 1, wherein the event-type is a resource failure.

6. The computer implemented method of claim 4, wherein the action comprises sending at least one remote notification message selected from the group consisting of a text message, electronic mail, and a voice message.

\* \* \* \* \*